Figure 1:
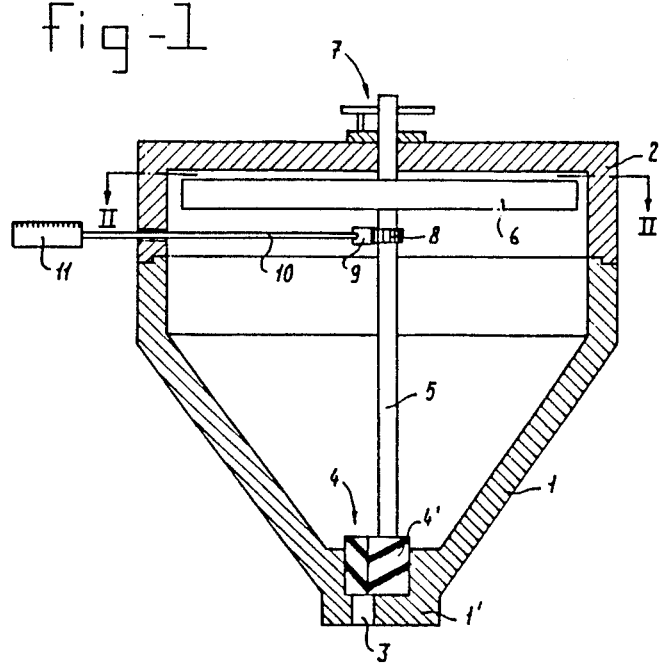

United States Patent [19]

Bras

[11] Patent Number: 4,799,574
[45] Date of Patent: Jan. 24, 1989

[54] LUBRICATION DEVICE

[75] Inventor: Johan C. M. Bras, Tricht, Netherlands

[73] Assignee: SKF Industrial Trading & Development Co. B.V., Nieuwegein, Netherlands

[21] Appl. No.: 61,696

[22] Filed: Jun. 12, 1987

[30] Foreign Application Priority Data

Jun. 25, 1986 [NL] Netherlands .......................... 8601666

[51] Int. Cl.⁴ .............................................. F16N 7/38
[52] U.S. Cl. ...................................... 184/27.1; 184/31; 184/45.2; 417/328
[58] Field of Search ....................... 184/5.1, 14.1, 27.1, 184/31, 45.2, 45.1; 417/328; 222/333, 336, 411, 412

[56] References Cited

U.S. PATENT DOCUMENTS

| | | | |
|---|---|---|---|
| 774,960 | 11/1904 | Walch | 184/45.2 |
| 1,640,407 | 8/1927 | Herbst | 184/45.2 |
| 1,732,725 | 10/1929 | Kohl et al. | 184/31 |
| 1,737,124 | 11/1929 | Phelps | 184/45.1 X |
| 1,929,774 | 10/1933 | Davis | 184/45.1 |
| 3,774,721 | 11/1973 | Hollowell | 184/5.1 |

FOREIGN PATENT DOCUMENTS 13517 of 1915 United Kingdom ............... 184/45.2

Primary Examiner—Leonard E. Smith
Attorney, Agent, or Firm—Rosen, Dainow & Jacobs

[57] ABSTRACT

A device for supplying a lubricant to a mechanism, particularly a rolling bearing, comprising a container for holding a quantity of lubricant and having at its lower end a discharge channel for the lubricant, and expulsion means disposed within the container for expelling the lubricant through the discharge channel. The expulsion means includes a displacement pump having a rotary part mounted in the discharge channel, a shaft coupled to the rotary part, shaft drive means and intermittent means coupled to the shaft drive for intermittently permitting the shaft drive means to be coupled to the shaft so as to rotate said shaft.

5 Claims, 1 Drawing Sheet

ELECTRONIC TIMING CKT.

LUBRICATION DEVICE

Device for supplying a lubricant to a mechanism, in particular a rolling bearing.

The invention concerns a device for supplying a lubricant to a mechanism, in particular a rolling bearing, comprising a container for holding a quantity of lubricant, which is provided at its lower end with a discharge channel for the lubricant, means being present in the container for expelling the lubricant from the discharge outlet. Such a device is disclosed in European Pat. No. 30911.

In the known device the means for expelling the lubricant from the container are formed by a pistonlike element mounted in the container and a spring acting on this element in such fashion that the spring force drives the pistonlike element in the direction of the discharge channel, whereupon the lubricant is placed between the said element and the discharge channel.

In this known device, after the device is mounted on the housing of the rolling bearing (not shown) to be lubricated, the lubricant is thus continuously expelled through the discharge channel, by an essentially constant quantity per unit of time, from the container into the bearing, because the spring, tensioned in the starting position, gradually expands and in so doing drives the pistonlike element in the direction of the discharge channel.

The disadvantage of this known device is that feeding of the lubricant cannot be controlled with it, so that often too much lubricant is supplied, resulting in an increase of the temperature of the bearing in operation. In addition, in the known device the supply of lubricant cannot be halted when, for example, a tool driven by a shaft supported by the bearing is shut down.

The object of the invention is to procure a device of the type mentioned which does not exhibit these disadvantages.

This object is accomplished in that in the device pursuant to the invention the expulsion means are formed by a rotary displacement pump mounted in the discharge channel, the rotary part of which pump is attached to a shaft, and means in contact with this shaft which are capable of forcing the shaft intermittently into rotation.

In a device designed in this way the lubricant is thus fed at intervals, so that the proper quantity of lubricant for the bearing concerned is supplied each time.

The means in contact with the shaft are preferably formed of a flat spiral spring, one end of which is connected with the container and the other end with the shaft, means being present for coiling and for permitting intermittent expansion of this spring. The means for permitting expansion of the spring therein advantageously comprise an adjustable timing mechanism.

It is noted that U.S. Pat. No. 3,430,731 discloses a device for supplying a lubricant, wherein the expulsion means are formed by a membrane capable of being exposed and mounted in a container for the lubricant provided with a discharge channel, which membrane at one side limits a chamber within the container holding the lubricant and at the other side a chamber within the container holding an electrolyte, there being present a plurality of galvanic elements to be introduced into this latter chamber, so that by introducing one or a plurality of these galvanic elements into the chamber a gas is developed to a particular extent, causing the membrane to expand gradually in the direction of the discharge channel, whereby the lubricant is expelled from the container. Although with this device the quantity of lubricant supplied per unit of time may be regulated, by a selection of the number of galvanic elements introduced into the electrolyte, such a set quantity can never be reduced. Likewise, once in operation, the device cannot be halted. In addition, the danger exists that gases harmful to the bearing to be lubricated may traverse the membrane.

Figure 2:
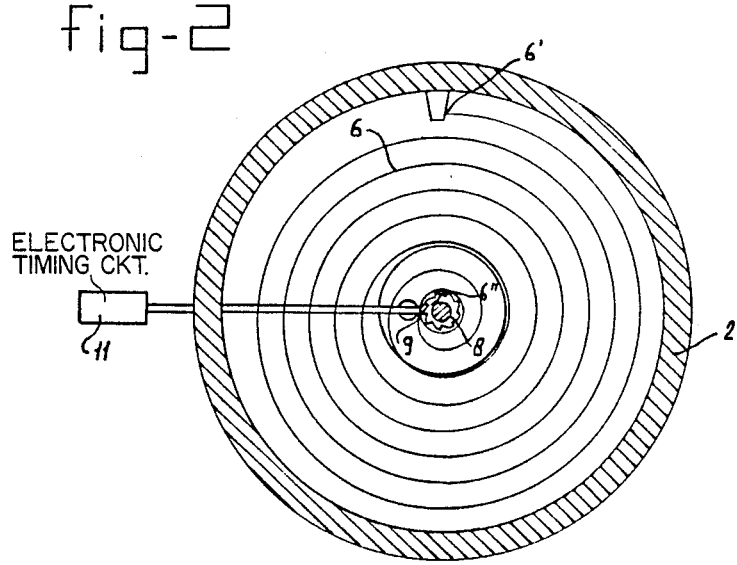

The invention is described in detail with the aid of the drawing, wherein:

FIG. 1 shows, in axial cross section, a diagram of the device pursuant to the invention, and FIG. 2 represents a cross section along line II—II in FIG. 1.

The device represented in the drawing comprises a container 1 with a detachable cover 2 secured thereon. The container 1, which may contain a quantity of lubricant, consists for the most part of a piece tapering downward, the lower end 1' being provided with coupling means, not illustrated, for example, an external screw thread for, for example, screwing the device tightly into an opening in the housing of a rolling bearing. In addition, the container 1 is in any case made of transparent material, so that the contents thereof are readily visible.

In the lower end is formed a discharge channel 3, which toward the inside is converted into a recess, wherein is located a worm gear pump 4, the rotary part 4' of which is attached to the lower end of a shaft 5 extending through the container 1 and the cover 2.

Within the cover 2 is mounted a flat spiral spring 6, one end 6' of which is attached to the inner wall of the cover 2 and the other end 6" to the shaft 5. The shaft 5 extends out through the cover 2, to the upper side thereof, the upper end of the shaft 5 being provided with means 7 for coiling the spiral spring 6.

In addition, on the shaft 5 is attached a ratchet wheel 8. This wheel 8 cooperates with a ratchet attached to a cross rod 10, so that this ratchet is normally in engagement with one of the teeth of the ratchet wheel 8, thus preventing the shaft 5 from rotating in the direction in which, upon expansion of the spring 6, the shaft 5 is forced into rotation. However, when the spring 6 is coiled or tensioned, whereat the shaft 5 is rotated in the opposing direction, the ratchet 9 ratchets over the ratchet wheel 8.

The ratchet wheel 9 may be disengaged from the ratchet wheel 8 by means of a timing mechanism 11 which is mounted at the end of the cross rod 10.

When the device is in operation, the container 1 is filled with a lubricant, while the spring 6 is tensioned. The timing mechanism 11 is adjusted so that at given intervals and for a given period the ratchet 9 is brought out of engagement with the ratchet wheel 8, so that the shaft 5 is brought into rotation by the spring 6, owing to which the worm gear pump 4 goes into operation and forces a given quantity of the lubricant located in the container 1 through the discharge channel 3 into the rolling bearing to be lubricated, so that the bearing is intermittently provided with lubricant. If the supply of lubricant must be halted, the timing mechanism 11 is then simply turned off.

It is noted that instead of a timing mechanism 11 operating mechanically, an electronic timing circuit, as shown in FIG. 2, may alternatively be used, which may be activated at intervals, whereby, for example, a group of lubricating devices of various bearing systems in a given space may be put into operation.

I claim:

1. A device for controllably supplying a lubricant to a mechanism, comprising a container for holding a quantity of lubricant and having a first end and a second end opposite to the first end, said container having at its second end a discharge channel for the lubricant, and means for controllably expelling lubricant from the container through the discharge channel, said expelling means comprising:

a rotatably-mounted shaft extending within the container from the first to the second end and being accessible outside of the container first end, a displacement pump wholly within the container adjacent the second end, said pump having a rotary part mounted in the discharge channel, said shaft at the container second end being drivingly coupled to the displacement pump such that rotation of the shaft in one direction causes rotation of the rotary part and expulsion of lubricant, a spiral spring mounted within the container and having one end fixed to the container and its other end fixed to the shaft and when coiled by winding up in a direction opposite to said one direction being capable of rotating the shaft in the said one direction, means connected to the shaft for releasably locking the shaft against rotation in the said one direction, means on the outside of the first end of the container and connected to the shaft for coiling the spring in said opposite direction, said spring when coiled causing the shaft to rotate in said one direction when the shaft is unlocked, and means accessible externally to the container and connected to the locking means for selectively unlocking and releasing the shaft whereby the coiled spring causes the shaft to rotate expelling lubricant by the action of the rotary part of the displacement pump through the discharge channel.

2. A device as claimed in claim 1, wherein the discharge channel has a much smaller cross-section than the container, the container tapers inward in the vicinity of its second end, and the locking means for the shaft comprises a rod extending transversely to the shaft and through a side wall of the container.

3. A device as claimed in claim 2, wherein the locking means further comprises a ratchet wheel on the shaft, a ratchet mounted on the rod and when engaging the ratchet wheel locking same against rotation in the first direction, and means for disengaging the ratchet from the ratchet wheel allowing the shaft to rotate in said one direction.

4. A device as claimed in claim 3, wherein means are providing for allowing transverse displacement of the rod, said rod when displaced in a direction away from the shaft causing the ratchet to disengage from the ratchet wheel.

5. A device as claimed in claim 4, wherein said spring is a flat spiral, and said spring is mounted adjacent the first end of the container.

* * * * *